United States Patent Office 2,886,613
Patented May 12, 1959

2,886,613

PURIFICATION OF UNREACTED BUTENE RECYCLE STREAM BY FRACTIONAL DISTILLATION

Ian C. Rush and Charles M. Finigan, Sarnia, Ontario, Canada, assignors to Polymer Corporation Limited, Sarnia, Ontario, Canada, a corporation of Canada No Drawing. Application July 13, 1956
Serial No. 597,606

10 Claims. (Cl. 260—680)

This invention relates to the catalytic dehydrogenation of olefins. It relates to those catalytic dehydrogenation processes in which the desired compound is extracted from the product stream and the balance of said stream is recontacted with dehydrogenation catalyst together with additional fresh reactants. Such recontacting is known as a "recycling operation." More particularly, the present invention relates to the catalytic dehydrogenation of n-butylene to form butadiene-1,3 employing a recycling operation.

A widely used method of producing useful products from olefins by dehydrogenation, such as for example the dehydrogenation of n-butylene to produce butadiene-1,3, is to contact the olefin in the presence of steam at a high temperature with certain well-known dehydrogenation catalysts. One such catalyst is the potassium oxide-promoted iron oxide catalyst disclosed in United States Patent No. 2,436,829, issued September 2, 1947 to Kenneth K. Kearby. Other catalysts include those in which the active ingredient is calcium nickel phosphate. One such catalyst is the pelleted calcium nickel phosphate-chromium oxide catalyst disclosed in United States Patent No. 2,442,320, issued May 25, 1948 to Andrew J. Dietzler et al.

In the normal operation of a catalytic dehydrogenation process, side reactions occur which cause a carbonaceous deposit on the catalyst. These deposits indicate that the reaction is not entirely selective and, because of them, it is necessary to use a cyclic process comprising alternately effecting dehydrogenation of the n-butylene known as the "process phase" and removal of the carbonaceous deposit from the catalyst. The latter step is known as the "regeneration phase" and, in the case of calcium nickel phosphate catalysts, is normally effected by passing a mixture of air and steam through the catalyst bed.

It is usual to maintain the temperature of the air-steam regeneration mixture entering the catalyst bed approximately equal to the temperature at which the steam-hydrocarbon mixture enters the catalyst bed during the process phase. This latter temperature is ordinarily called the "process mixed feed temperature." The regeneration of the catalyst is exothermic and the temperature of the catalyst bed is thereby substantially raised during regeneration. The magnitude of the rise in temperature during regeneration is dependent, at least in part, on the amount and distribution of carbon deposit on the catalyst. The difference in Fahrenheit degrees between maximum regeneration temperature and process mixed feed temperature on the preceding process phase is herein defined as "$\Delta F$" and is a term well recognized in the art. The $\Delta F$ must be essentially constant from cycle to cycle lest it quickly reach a value which will damage the catalyst bed. It is appreciated by those skilled in the art that a large $\Delta F$ is indicative of poor catalyst condition or performance and must be remedied; otherwise the effective life of the catalyst will be greatly reduced. It is recognized that the dehydrogenation feed should be of uniform composition to avoid erratic fluctuations in $\Delta F$.

Since dehydrogenation reactions are not entirely selective, the product contains a variety of secondary products as well as unchanged material. The desired material is only obtained in substantially pure form by separation from the reaction product. To be commercially economical, it is necessary to recontact the unconverted material with the dehydrogenation catalyst such as for example, by a recycling operation.

It is an object of the present invention to disclose an improved method of dehydrogenating an olefinic compound.

A further object of this invention is to disclose a method which improves the catalytic dehydrogenation of mono-olefinic compounds to diolefinic compounds.

It is a still further object of the present invention to disclose an improved method for the catalytic dehydrogenation of n-butylene to butadiene-1,3 by the elimination of certain catalyst poisons which reduce the efficiency of the said dehydrogenation reaction.

These and other objects of this invention are obtained in the method of dehydrogenating an olefinic compound containing at least four carbon atoms in the olefinic chain and which comprises contacting said olefinic compound at a temperature of 950–1350° F. with a dehydrogenation catalyst, extracting the desired product from the reaction effluent with a solvent preferential for said desired component whereby to produce a hydrocarbon-rich solvent and a raffinate hydrocarbon containing the unconverted olefinic compound, and recontacting said raffinate hydrocarbon with said dehydrogenation catalyst, either alone or together with fresh olefin, the improvement which comprises the fractional distillation of said raffinate hydrocarbon prior to said recontacting reaction.

The invention applies in general to all those catalytic dehydrogenation reactions in which the deposition of carbonaceous material on the catalytic material necessitates the use of a cyclic operation of alternate dehydrogenation and regeneration phases. However, the invention will be described with particular reference to the production of butadiene-1,3 by the catalytic dehydrogenation of n-butylene using a pelleted calcium nickel phosphate-chromium oxide catalyst.

The conversion of n-butylene to butadiene-1,3 is about 18–35 weight percent, so that the reaction product contains a large percentage of unconverted n-butylene. In order to obtain substantially pure butadiene-1,3 it is necessary to separate it from the other hydrocarbons. This is usually done by a countercurrent extraction of the product. One suitable extraction operation involves the preferential extraction of the liquefied gaseous butadiene-1,3 product by countercurrent contact with an ammoniacal solution of copper ions with an anion capable of forming a cuprous salt soluble in such ammoniacal solution. Examples of such anions are acetate, formate, glycolate, salicylate, sulfate, phosphate, lactate, tartrate, borate, carbonate, chloride, fluoride, thioglycolate, benzoate, benzene sulfonate, orthophosphate, cyanide, maleate, etc. Normally, such solvent is a solution containing 2.5–3.5 moles of cuprous copper, 0.15–0.4 mole of cupric copper and greater than 10 moles of ammonia, with the anion being acetate. The solution may be aqueous, or an aqueous methanolic, ethanolic, n-propanolic or isopropanolic solution. The unabsorbed hydrocarbon is returned to the dehydrogenation reactor for further conversion of n-butylene to butadiene-1,3. The butadiene-rich solvent is sent to a desorber unit where the butadiene-1,3 is flashed off as a vapour and recovered in substantially pure form.

It has been found in the commercial production of butadiene-1,3 by the dehydrogenation of n-butylene over a calcium nickel phosphate-chromium oxide catalyst followed by extraction of the butadiene-1,3 from the product using cuprous ammonium acetate solvent that, when the raffinate i.e., unabsorbed, hydrocarbon from the extratcion process is recycled to the dehydrogenation reactor, the ΔF is subject to unpredictable sudden increases. In some cases the increase appears to be related to unstable operation of the extraction process. Moreover, when such raffinate is recycled to the dehydrogenation reactors, the activity of the catalyst, i.e. its ability to dehydrogenate n-butylene to butadiene-1,3 declines rapidly during the course of each process phase and, although such activity is restored by each subsequent regeneration phase, there is a net decrease in such catalyst activity. It has not been appreciated previously that the raffinate hydrocarbon stream from the extraction process could introduce catalyst poisons which result in lowered catalyst efficiency.

It has been found that by distilling the raffinate hydrocarbon from the extraction operation before recycling it to the dehydrogenation reactor the sudden increases in ΔF are avoided. While it is not desired to limit the present invention to any theory, it is believed that a possible explanation for this behaviour is that distillation removes some material which is a poison for the catalyst. Exhaustive tests have failed to identify the poisoning material, probably because it is present in such small concentration.

The following examples further illustrate the poisoning of the catalyst and the means of avoiding such poisoning using the process of the present invention.

EXAMPLE I

The conventional dehydrogenation of n-butylene to butadiene-1,3 was carried out in admixture with steam over a calcium nickel phosphate-chromium oxide catalyst at a temperature of 1115° F. The product, which may be designated as "impure butadiene-1,3," was placed in a storage sphere. The ΔF was essentially constant from cycle to cycle at a value of about 45 Fahrenheit degrees.

A countercurrent extraction using ammoniacal cuprous acetate was then begun using impure butadiene-1,3 feed from the storage sphere and recycling the raffinate hydrocarbon from the extraction operation to the dehydrogenation reactor. Almost immediately the ΔF increased to about 90 Fahrenheit degrees. To bring the ΔF down so that the catalyst would not be damaged required a reduction in the mixed feed temperature to 1050° F. The result was a decrease in the conversion of n-butylene from about 26% to about 16%.

EXAMPLE II

During conventional dehydrogenation of n-butylene to butadiene-1,3 and extraction of the product to recover butadiene-1,3 using ammoniacal cuprous acetate, an additional stream of impure butadiene-1,3 was introduced from storage to the extraction unit. This increased the rate of flow through the extraction system. When the recycle stream reached the dehydrogenation reactors, the value of ΔF increased from 60 to 81. The mixed feed temperature was lowered from 1200° F. to 1175° F. but this change did not improve the operation. The extra feed to the extraction unit was then terminated and ΔF returned to normal.

This test shows that, when the rate of flow through the extraction unit is very high and the operation less efficient, the raffinate hydrocarbon to the dehydrogenation reactor contains some material which appears to be a catalyst poison.

EXAMPLE III

This experiment was carried out to test the effect on dehydrogenation conditions of distilling the recycle hydrocarbon from the extraction unit before feeding it to the dehydrogenation reactor.

Conventional dehydrogenation of n-butylene in a hydrocarbon stream comprising fresh feed and raffinate from a copper ammonium acetate butadiene-1,3 extraction unit mixed with steam was carried out over a calcium nickel phosphate-chromium oxide catalyst. The raffinate stream was replaced with a similar raffinate which had been previously distilled in a column of 30 plates with a reflux ratio of 5–6, removing a bottoms cut of 5%. This was continued for 35 hours after which normal operation was resumed. The average values of the ΔF during the test period are shown in Table I.

*Table I*

|  | ΔF (in Fahrenheit degrees) | | | |
| --- | --- | --- | --- | --- |
| Reactor number | 1 | 2 | 3 | 4 |
| Average values before fractionating raffinate component | 84 | 78 | 60 | 64 |
| Average values for the 35-hour test period | 70 | 65 | 63 | 67 |
| Average values for a 13-hour period immediately subsequent to the 35-hour test period | 73 | 68 | 70 | 75 |

These results show that poisoning of the catalyst in reactors 1 and 2 was reduced by purifying the raffinate stream. Reactors 3 and 4 were operating at a lower ΔF before distillation began and it appears that the catalyst in these reactors was not as susceptible to poison as that in reactors 1 and 2. However, when the use of undistilled raffinate was resumed, the ΔF for reactors 3 and 4 increased significantly, indicating a poisoning effect.

These results show that there appears to be a poisoning of the catalyst by impurities which occur in the raffinate stream from an extraction unit. They show, moreover, that the poisoning effect can be effectively decreased by distilling the raffinate stream from the extraction unit prior to recontacting such stream with the catalyst.

What we claim is:

1. In the method of dehydrogenating an olefinic compound containing at least four carbon atoms in the olefinic chain which comprises contacting said olefinic compound at a temperature of 950–1350° F. in a dehydrogenation zone with a dehydrogenation catalyst the active ingredient of which is calcium nickel phosphate, extracting the desired product from the reaction effluent with an ammoniacal cuprous salt solvent whereby to produce a hydrocarbon-rich solvent and a raffinate hydrocarbon containing unconverted olefinc compound, and recontacting said raffinate hydrocarbon with said dehydrogenation catalyst, the improvement which comprises separating and discarding a bottoms cut from said raffinate hydrocarbon by means of a fractional distillation thereof, and recycling the overhead from said raffinate distillation to the dehydrogenation zone.

2. In the method of manufacturing a diolefinic hydrocarbon having at least four carbon atoms in the olefinic chain which comprises contacting an olefinic hydrocarbon containing at least four carbon atoms in the olefinic chain in admixture with steam and at a temperature of 950–1350° F. in a dehydrogenation zone over a dehydrogenation catalyst the active ingredient of which is calcium nickel phosphate, extracting the diolefinic hydrocarbon from the dehydrogenation product by countercurrent extraction with an ammoniacal cuprous salt solution whereby to produce an diolefinic hydrocarbon-rich solvent and a raffinate hydrocarbon containing unconverted olefinic hydrocarbon, and recontacting said raffinate hydrocarbon with said dehydrogenation catalyst, the improvement which comprises separating and discarding a bottoms cut from said raffinate hydrocarbon by means of a fractional distillation thereof, and recycling the overhead from said raffinate distillation to the dehydrogenation zone.

3. In the method of manufacturing butadiene-1,3 which comprises contacting n-butylene in the presence of steam and at 950–1350° F. in a dehydrogenation zone with a dehydrogenation catalyst the active ingredient of which is calcium nickel phosphate, extracting the butadiene-1,3 by countercurrent extraction with an ammoniacal cuprous salt solution whereby to produce a butadiene-1,3 rich solvent and a raffinate hydrocarbon containing unconverted n-butylene, and recontacting said raffinate hydrocarbon with said dehydrogenation catalyst, the improvement which comprises separating and discarding a bottoms cut from said raffinate hydrocarbon by means of a fractional distillation thereof, and recycling the overhead from said raffinate distillation to the dehydrogenation zone.

4. The method as in claim 3 where said dehydrogenation catalyst is calcium nickel phosphate promoted with chromium oxide.

5. The method as in claim 3 in which the anion of said ammoniacal cuprous salt is selected from the group of anions consisting of acetate, formate, glycolate and salicylate.

6. The method as claimed in claim 3 wherein the overhead from said raffinate distillation is mixed with fresh unreacted n-butylene prior to said recontacting reaction.

7. The method as claimed in claim 6 in which the anion of said ammoniacal cuprous salt is selected from the group of anions consisting of acetate, formate, glycolate and salicylate.

8. The improved process as claimed in claim 1 wherein a 5% bottoms cut from the raffinate is discarded.

9. The improved process as claimed in claim 2 wherein a 5% bottoms cut from the raffinate is discarded.

10. The improved process as claimed in claim 3 wherein a 5% bottoms cut from the raffinate is discarded.

References Cited in the file of this patent

UNITED STATES PATENTS

| | | |
|---|---|---|
| 2,386,350 | Schulze | Oct. 9, 1945 |
| 2,397,996 | Wilson | Apr. 9, 1946 |
| 2,442,320 | Britton et al. | May 25, 1948 |
| 2,750,435 | Fetchin | June 12, 1956 |